(12) United States Patent
Tajika et al.

(10) Patent No.: US 10,189,065 B2
(45) Date of Patent: Jan. 29, 2019

(54) STEEL PIPE, STEEL PIPE STRUCTURE, METHOD OF MANUFACTURING STEEL PIPE, AND METHOD OF DESIGNING STEEL PIPE

(71) Applicant: JFE Steel Corporation, Tokyo (JP)

(72) Inventors: Hisakazu Tajika, Tokyo (JP); Satoshi Igi, Tokyo (JP)

(73) Assignee: JFE Steel Corporation (JP)

( * ) Notice: Subject to any disclaimer, the term of this patent is extended or adjusted under 35 U.S.C. 154(b) by 0 days.

(21) Appl. No.: 15/556,368

(22) PCT Filed: Mar. 7, 2016

(86) PCT No.: PCT/JP2016/056999
§ 371 (c)(1),
(2) Date: Sep. 7, 2017

(87) PCT Pub. No.: WO2016/143743
PCT Pub. Date: Sep. 15, 2016

(65) Prior Publication Data
US 2018/0104731 A1 Apr. 19, 2018

(30) Foreign Application Priority Data
Mar. 12, 2015 (JP) .................... 2015-049513

(51) Int. Cl.
*F16L 9/00* (2006.01)
*B21C 37/16* (2006.01)
(Continued)

(52) U.S. Cl.
CPC .......... *B21C 37/16* (2013.01); *B21C 37/0803* (2013.01); *B21C 37/30* (2013.01);
(Continued)

(58) Field of Classification Search
CPC .................................... F16L 9/06; F16L 9/165
(Continued)

(56) References Cited

U.S. PATENT DOCUMENTS 3,779,312 A * 12/1973 Withers, Jr. ........... B21D 15/06
138/122
4,007,774 A * 2/1977 Withers, Jr. .............. F28F 1/42
165/184
(Continued)

FOREIGN PATENT DOCUMENTS

CN        2864280 Y    1/2007
JP    2013-212521 A   10/2013
(Continued)

OTHER PUBLICATIONS

Office Action dated Jul. 19, 2018, of counterpart Chinese Application No. 201680014323.3 along with its Search Report in English.
(Continued)

*Primary Examiner* — Patrick F Brinson
(74) *Attorney, Agent, or Firm* — DLA Piper LLP (US)

(57) ABSTRACT

In a steel pipe having a waveform shape formed on an outer diameter thereof by a pipe expansion process, a value a/w is 0.038% or less, where a and w denote an amplitude and a wavelength of the waveform shape, respectively. A method of manufacturing a steel pipe having a waveform shape formed on an outer diameter thereof by a pipe expansion process includes a step of forming the waveform shape such that a value a/w is 0.038% or less, where a and w denote an amplitude and a wavelength of the waveform shape, respectively.

6 Claims, 4 Drawing Sheets

(51) Int. Cl.
*B21C 37/30* (2006.01)
*B21C 37/08* (2006.01)
*F16L 9/02* (2006.01)
*B23K 101/06* (2006.01)
*B23K 31/02* (2006.01)

(52) U.S. Cl.
CPC .................. *F16L 9/006* (2013.01); *F16L 9/02* (2013.01); *B23K 31/027* (2013.01); *B23K 2101/06* (2018.08)

(58) Field of Classification Search
USPC ................................. 138/121, 122, 177, 178
See application file for complete search history.

(56) References Cited

U.S. PATENT DOCUMENTS

| | | | | |
|---|---|---|---|---|
| 4,305,460 A * | 12/1981 | Yampolsky | ............ | B21D 15/04 |
| | | | | 138/154 |
| 4,330,036 A * | 5/1982 | Satoh | ............ | F28F 1/42 |
| | | | | 165/179 |
| T103,901 I4 * | 2/1984 | Lupke et al. | ....... | F16L 25/0036 |
| | | | | 138/122 |
| 5,680,772 A * | 10/1997 | Furukawa | ............ | F25B 37/00 |
| | | | | 62/476 |
| 8,354,084 B2 * | 1/2013 | Tallis | ............ | B01J 6/008 |
| | | | | 422/198 |
| 8,555,932 B2 * | 10/2013 | Twist | ............ | E03F 3/04 |
| | | | | 138/122 |
| 8,573,260 B2 * | 11/2013 | Twist | ............ | E03F 3/04 |
| | | | | 138/122 |
| 8,839,823 B2 * | 9/2014 | Twist | ............ | E03F 3/04 |
| | | | | 138/122 |
| 8,985,160 B2 * | 3/2015 | Twist | ............ | E03F 3/04 |
| | | | | 138/122 |
| 2014/0202576 A1 | 7/2014 | Shitamoto | | |
| 2015/0090361 A1 * | 4/2015 | Tajika | ............ | B21C 37/08 |
| | | | | 138/177 |

FOREIGN PATENT DOCUMENTS

| | | |
|---|---|---|
| JP | 2013-231506 A | 11/2013 |
| JP | 5447461 B2 | 3/2014 |
| JP | 2015-13314 A | 1/2015 |
| RU | 1802446 A1 | 12/1995 |
| RU | 2273540 C1 | 4/2006 |
| SU | 1530292 A1 | 12/1989 |

OTHER PUBLICATIONS

Office Action dated Jul. 19, 2018, of counterpart Russian Application No. 2017131621 along with an English translation.

* cited by examiner

STEEL PIPE, STEEL PIPE STRUCTURE, METHOD OF MANUFACTURING STEEL PIPE, AND METHOD OF DESIGNING STEEL PIPE

TECHNICAL FIELD

This disclosure relates to a steel pipe, a steel pipe structure, a method of manufacturing a steel pipe, and a method of designing a steel pipe.

BACKGROUND

In recent years, gas fields and oil fields are newly developed in abundance due to an increase in demand for gas and petroleum. There are increasing opportunities to embed pipelines that transport gas and petroleum in earthquake-prone areas and non-permafrost areas. However, in such earthquake-prone areas and non-permafrost areas, the ground may be moved due to various causes such as liquefaction, fault displacements, frost heaving, and thawing, and the pipelines may be deformed accordingly. Further, when a pipeline is deformed significantly, steel pipes structuring the pipeline are bent. The pipe can then buckle on the compression side and subsequently break on the tensile side. With these circumstances in the background, techniques of improving deformability of steel pipes so that the steel pipes bend without buckling have been proposed from a viewpoint of preventing damages in the buckling part and preventing leakage of gas or petroleum from the broken part. More specifically, Japanese Patent No. 5447461 (see claim 1 and paragraph 0044) describes a technique of improving the deformability of a steel pipe by arranging a wavelength ratio (the wavelength of a waveform shape/a Timoshenko's buckling wavelength) of the waveform shape (undulation) to be 0.8 or smaller, the waveform shape being formed by outer diameters along the longitudinal direction of the steel pipe through a pipe expansion process.

According to the technique described in Japanese Patent No. 5447461 (see claim 1 and paragraph 0044), while the amplitude of the waveform shape is arranged to have a constant value throughout (0.73 mm=0.06% of OD, where "OD" denotes the diameter of the steel pipe), the range of the wavelength ratio of the waveform shape that can improve the deformability of the steel pipe is defined. However, as a result of extensive studies, we discovered that, even when the wavelength ratio of the waveform shape is in the abovementioned range, deformability of steel pipes may be lowered in some situations depending on the value of the amplitude of the waveform shape. Further, generally speaking, the smaller the wavelength ratio of a waveform shape is, the shorter is the forwarding pitch of the die in the longitudinal direction of the steel pipe during the pipe expansion process. Therefore, when the technique described Japanese Patent No. 5447461 (see claim 1 and paragraph 0044) is used, the labor and time required by the pipe expansion process increase in accordance with the improvement of the deformability of the steel pipe. For this reason, there is a demand for a technique that is able to improve the deformability of steel pipes while reducing the labor and time required by the pipe expansion process.

In view of the circumstances described above, it could be helpful to provide a steel pipe, a steel pipe structure, a method of manufacturing a steel pipe, and a method of designing a steel pipe with which it is possible to improve the deformability while reducing the labor and time required by the pipe expansion process.

SUMMARY

Our steel pipe has a waveform shape formed on an outer diameter thereof by a pipe expansion process. Further, a value "a/w" is 0.038% or less, where "a" and "w" denote an amplitude and a wavelength of the waveform shape, respectively.

According to our steel pipe, a value "w/λ," indicating a ratio of the wavelength "w" of the waveform shape to a Timoshenko's buckling wavelength "λ" is larger than 0.8.

Our steel pipe structure is formed by using our steel pipe. The steel pipe structure includes, for example, a pipeline, a steel pipe pile, a steel pipe sheet pile, and a water gate penstock.

A method of manufacturing a steel pipe manufactures a steel pipe having a waveform shape formed on an outer diameter thereof by a pipe expansion process. Further, the pipe expansion process includes a step of forming the waveform shape such that a value "a/w" is 0.038% or less, where "a" and "w" denote an amplitude and a wavelength of the waveform shape, respectively.

A method of designing a steel pipe designs a steel pipe having a waveform shape formed on an outer diameter thereof by a pipe expansion process, and includes a step of evaluating, with respect to the steel pipe to be manufactured, the relationship between a ratio "w/λ" and a buckling-time bending angle by using Expression (1) below, the ratio "w/λ" indicating a ratio of a wavelength "w" of the waveform shape to a Timoshenko's buckling wavelength "λ", and further determining the wavelength "w" and an amplitude "a" of the waveform shape, on a basis of a result of the evaluation:

$$\text{The buckling-time bending angle} = (D1+D2)/2 + (D1-D2)/2 * \tanh((-X+\alpha)/\beta) \quad (1)$$

where parameters "D1", "D2", "α", and "β" in Expression (1) have values that are determined by the outer diameter and a thickness of the steel pipe to be manufactured.

By using any of the steel pipe, the steel pipe structure, the method of manufacturing a steel pipe, and the method of designing a steel pipe, it is possible to improve deformability while reducing the labor and time required by the pipe expansion process.

REFERENCE SIGNS LIST

P STEEL PIPE

DETAILED DESCRIPTION

Figure 1:
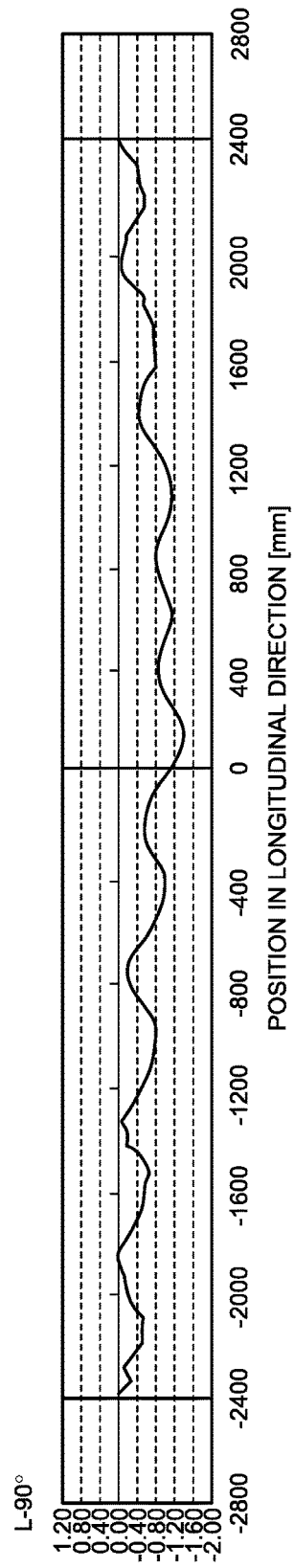
FIG. 1 is a drawing illustrating an example of an outside diameter shape of a steel pipe.

To evaluate buckling phenomena occurring in the vicinity of a welded joint part of a steel pipe, we performed a bending test on a steel pipe (a UOE steel pipe having an outside diameter of 48 inches (1,219 mm) and a thickness of 22 mm) having a welded joint part. When the outside diameter shape of the steel pipe was measured prior to the bending test, the outside diameter shape of the steel pipe appeared to be a waveform shape and exhibited variances. The variances were caused by a pipe expansion process performed on the steel pipe. The wavelength of the waveform shape was similar to the forwarding cycle of a die used in the pipe expansion process. All the amplitude values of the waveform shape were substantially equal to one another and were caused by a constant mechanical diameter-expanding process. FIG. 1 illustrates the outside diameter shape of the steel pipe that was measured. In FIG. 1, the point at which the position in the longitudinal direction is "0" corresponds to the position of the welded joint. In the example illustrated in FIG. 1, the wavelength of the waveform shape was approximately 400 mm.

Figure 2:
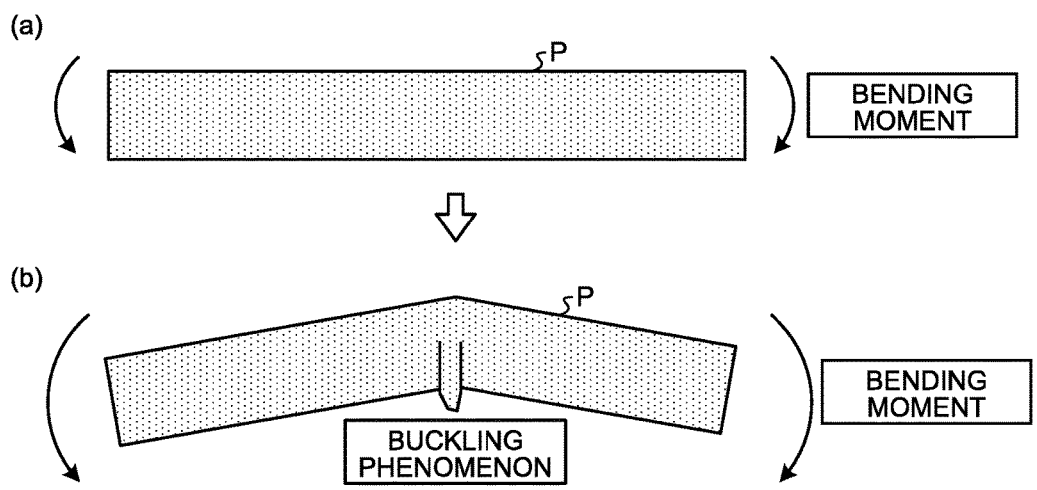
FIG. 2 is a schematic drawing for explaining a bending buckling phenomenon of a steel pipe.
Figure 3:
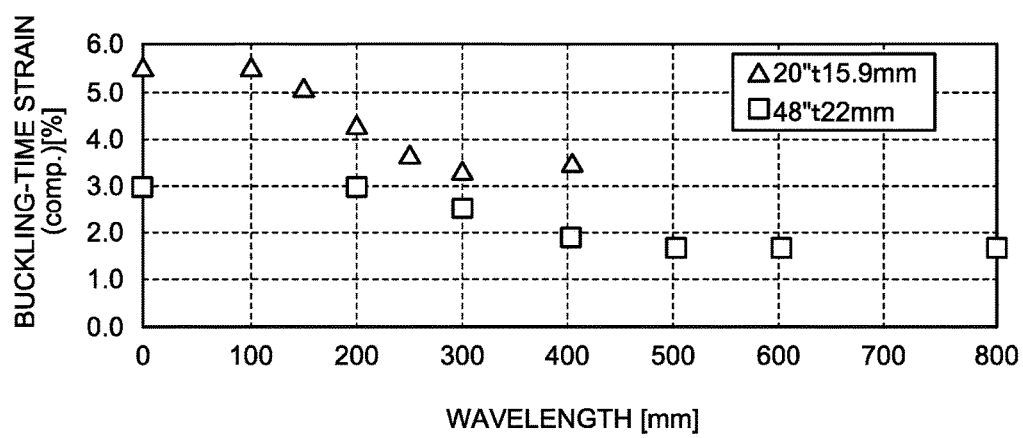
FIG. 3 is a chart illustrating a result of an analysis performed on strains exhibited at the time of buckling (hereinafter, "buckling-time strains") of a steel pipe having an outside diameter of 20 inches and a thickness of 15.9 mm and another steel pipe having an outside diameter of 48 inches and a thickness of 22 mm.

FIG. 2 illustrates an overview of a bending buckling phenomenon of a steel pipe. In some situations, a steel pipe P may exhibit a bending buckling phenomenon as illustrated in FIG. 2, when having gone through a significant deformation (a bending moment) due to liquefaction of the ground or moving of a fault. Thus, to study a bending deformation amount of a steel pipe that can be tolerated before the occurrence of the bending buckling phenomena, a plurality of analysis models were created by varying the wavelength of the waveform shape to compare deformability characteristics by using the analysis models. FIG. 3 illustrates a result of the analysis performed on strains exhibited at the time of buckling (hereinafter, "buckling-time strains") of a steel pipe having an outside diameter of 20 inches and a thickness of 15.9 mm and another steel pipe having an outside diameter of 48 inches and a thickness of 22 mm. In FIG. 3, the vertical axis expresses a buckling-time strain (a moving-average strain at the time of buckling), whereas the horizontal axis expresses the wavelength of the waveform shape applied to each of the analysis models.

The buckling-time strain has a proportional relationship with the deformation amount and the curvature of a steel pipe. In other words, a steel pipe that buckles with a small deformation amount or a small curvature (i.e., a steel pipe having a small buckling-time strain) has a low degree of deformability. Conversely, a steel pipe that did not buckle until a large deformation amount or a large curvature was exhibited (i.e., a steel pipe having a large buckling-time strain) has a high degree of deformability and is therefore considered to be applicable to a severe environment such as an earthquake-prone area.

As illustrated in FIG. 3, for both the steel pipe having an outside diameter of 20 inches and a thickness of 15.9 mm and the other steel pipe having an outside diameter of 48 inches and a thickness of 22 mm, the smaller the wavelength of the waveform shape is, the larger the buckling-time strain becomes. Also, when the wavelength of the waveform shape is small to a certain extent, a buckling-time strain equal to or larger than a certain value is exhibited. Further, as the wavelength of the waveform shape increases, the buckling-time strain decreases with an S-shaped plot line at a certain threshold value. These characteristics indicate that it is possible to provide a steel pipe having an excellent level of deformability by arranging the wavelength of the waveform shape to be equal to or lower than the certain threshold value.

Figure 4:
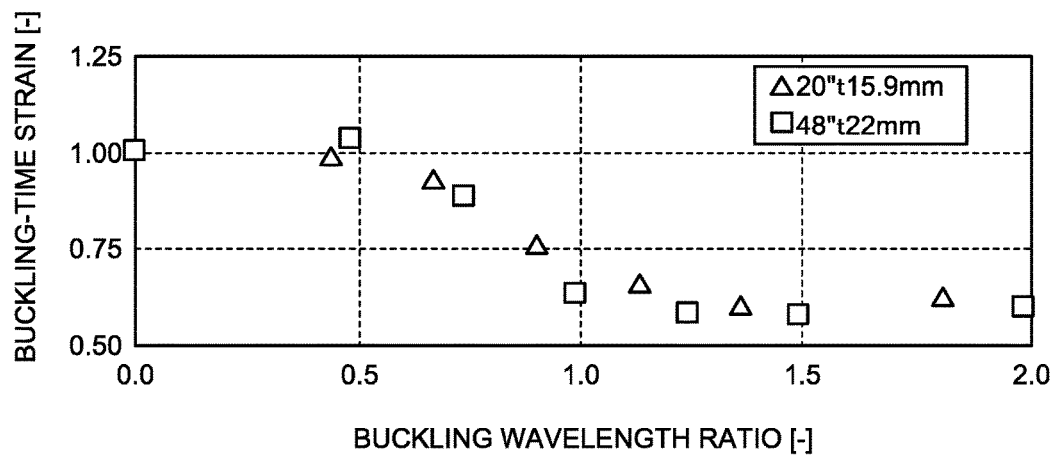
FIG. 4 is a chart illustrating a graph obtained by normalizing the horizontal axis in FIG. 3 by using a buckling wavelength and by normalizing the vertical axis in FIG. 3 by using the buckling-time strain observed when a wavelength is equal to 0.

Accordingly, the analysis result in FIG. 3 comparing the two steel pipes having the mutually-different outer diameters and the mutually-different thicknesses with each other was normalized. FIG. 4 illustrates a graph obtained by normalizing the horizontal axis in FIG. 3 by using a buckling wavelength λ (where "λ" denotes the Timoshenko's buckling wavelength) and normalizing the vertical axis in FIG. 3 by using the buckling-time strain observed when the wavelength is equal to 0. As illustrated in FIG. 4, between the steel pipe having an outside diameter of 20 inches and a thickness of 15.9 mm and the other steel pipe having an outside diameter of 48 inches and a thickness of 22 mm, the relationship is substantially the same between the buckling-time strain and the ratio of the wavelength of the waveform shape to the buckling wavelength λ (i.e., the wavelength of the waveform shape/the buckling wavelength λ; hereinafter, "buckling wavelength ratio").

On the basis of this relationship, it is possible to maintain the buckling-time strain at a high level by arranging the buckling wavelength ratio to be within a range less than or equal to 0.50. Further, when the buckling wavelength ratio becomes approximately 1.0, the buckling-time strain becomes equivalent to the buckling-time strain exhibited when the buckling wavelength ratio is larger than 1.0 to be as low as approximately 65% of the buckling-time strain exhibited when a steel pipe has a buckling wavelength ratio of 0.5 or smaller.

To shorten the wavelength of the waveform shape, an effective method is to press a die in an overlapping manner so that, during the pipe expansion process, the positions onto which the die is pressed are overlapped in the longitudinal direction of the steel pipe. Accordingly, by using steel pipes each having an outside diameter of 24 inches, an evaluation was made on the waveform shape formed by outer diameters, with respect to a steel pipe to which the overlapping die pressing was applied and another steel pipe to which the overlapping die pressing was not applied. In this situation, the effective length of the die was approximately 450 mm. During the pipe expansion process, the one pipe was prepared by pressing the die with a pitch of 450 mm, and the other pipe was prepared by pressing the die with a smaller pitch of 80 mm (by pressing the die five or six times per effective length).

As a result, we confirmed that the waveform shape formed on the outer diameters is dependent on the manner in which the die is pressed on the steel pipe. More specifically, during the pipe expansion process, the steel pipe on which the die was pressed with the pitch of 450 mm had a waveform shape of which the wavelength was approximately 430 mm to 450 mm. In contrast, during the pipe expansion process, the steel pipe on which the die was pressed with the pitch of 80 mm had a waveform shape of which the wavelength was approximately 60 mm to 70 mm. Further, we also confirmed that the manner in which the die is pressed on the steel pipe also has an impact on the amplitude of the waveform shape and that the smaller the pitch for the pressing of the die is, the smaller the amplitude of the waveform shape is.

Figure 5:
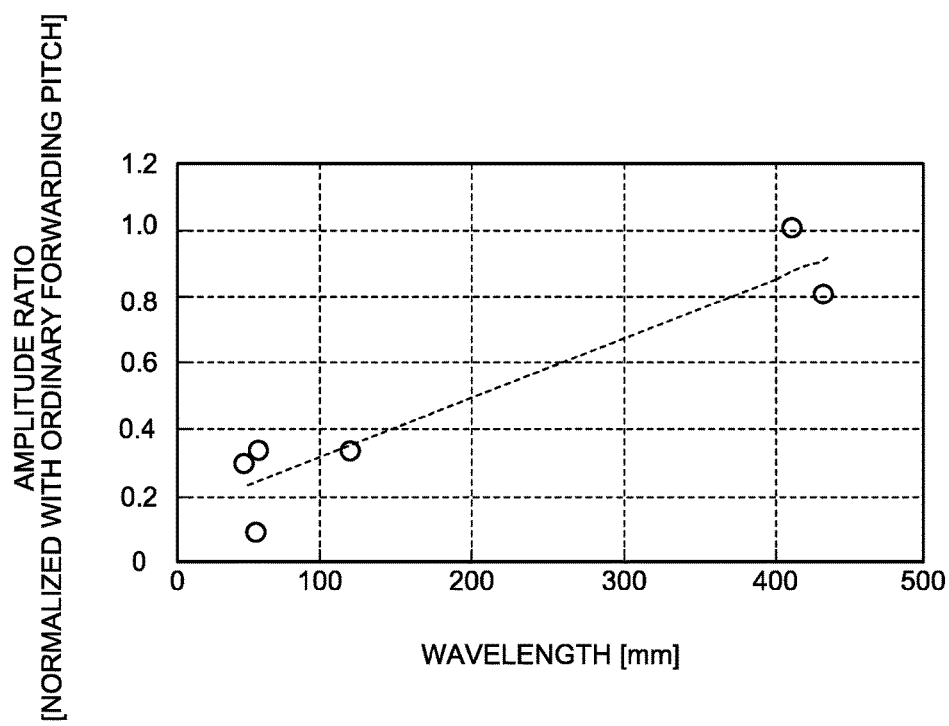
FIG. 5 is a chart indicating the relationship between wavelengths and amplitude ratios.

Accordingly, we evaluated relationships between wavelengths and amplitudes of the waveform shape. FIG. 5 is a chart indicating a relationship between wavelengths and amplitude ratios. As indicated in FIG. 5, wavelengths and amplitudes of the waveform shape are in a proportional relationship with each other. Consequently, it is possible to improve the deformability of steel pipes by pressing the die finely with a smaller pitch. For this reason, we regarded a ratio "a/w" of the amplitude "a" to the wavelength "w" of the waveform shape as a new design factor and evaluated impacts made on the deformability by values of the design factor a/w.

Figure 6:
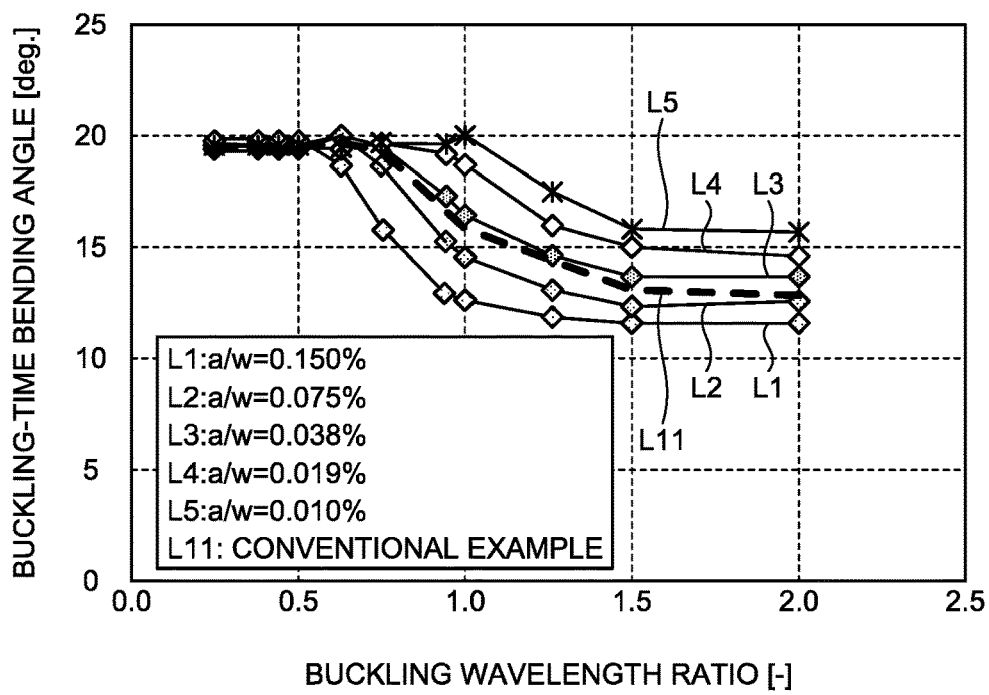
FIG. 6 is a chart illustrating the relationship between buckling wavelength ratios and bending angles at the time of buckling (hereinafter, "buckling-time bending angles") corresponding to values of a design factor a/w.

FIG. 6 is a chart illustrating a relationship between buckling wavelength ratios and bending angles at the time of buckling (hereinafter, "buckling-time bending angles") corresponding to values of the design factor a/w. As illustrated in FIG. 6, we observed that the buckling wavelength ratio to reach the maximum value (approximately 20 degrees in this example) of the buckling-time bending angle was different for the values of the design factor a/w, and we confirmed that the buckling-time bending angle increases as the value of the design factor a/w decreases. Further, we evaluated the relationship between buckling wavelength ratios and buckling-time bending angles, derived from the technique described in Japanese Patent No. 5447461 (see claim 1 and paragraph 0044). As a result, as indicated by a feature line L11 in FIG. 6, we confirmed that the buckling-time bending angle based on the technique described in Japanese Patent No. 5447461 (see claim 1 and paragraph 0044) is smaller than the buckling-time bending angle indicated by a feature line L3 and corresponds to the situation where the value of the design factor a/w is equal to 0.038%.

The above notion signifies that, by arranging the value of the design factor a/w to be equal to or smaller than 0.038%, and preferably by arranging the value of the design factor a/w to be equal to or smaller than 0.038% while arranging the buckling wavelength ratio to be larger than 0.8, it is possible to achieve the buckling wavelength ratio required by realizing the buckling-time bending angle described in Japanese Patent No. 5447461 (see claim 1 and paragraph 0044), i.e., it is possible to increase the die forwarding amount during the pipe expansion process. Accordingly, by adjusting the wavelength and the amplitude of the waveform shape to arrange the value of the design factor a/w to be equal to or smaller than 0.038%, it is possible to improve the deformability while reducing the labor and time required by the pipe expansion process.

Figure 7:
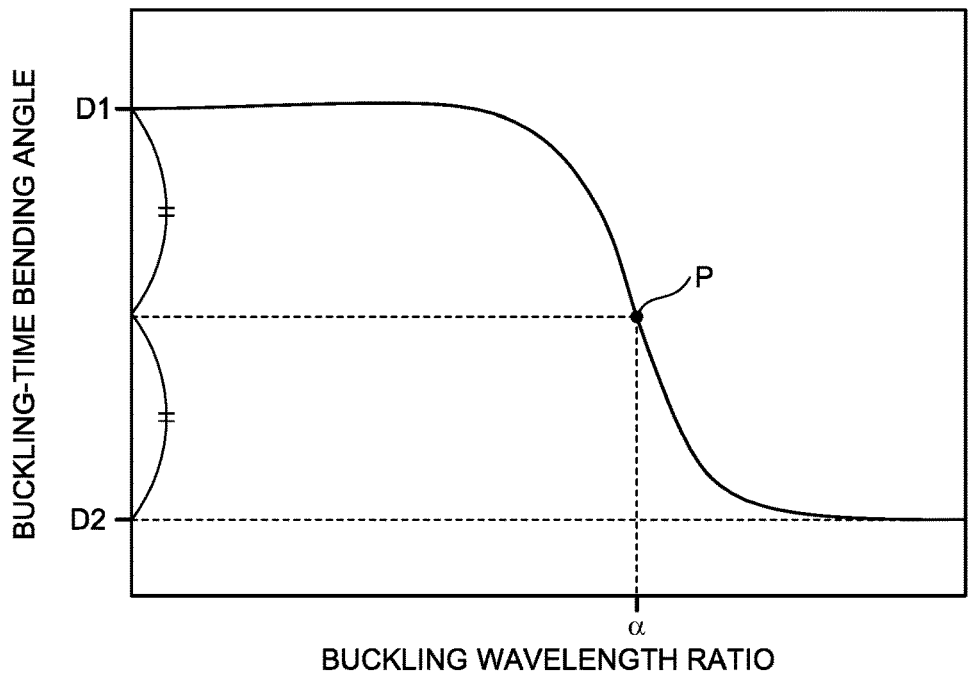
FIG. 7 is a chart illustrating the relationship between the buckling wavelength ratios and the buckling-time bending angles.

By generalizing the feature lines indicated in FIG. 6, it is possible to express the relationship between the buckling-time bending angle and the buckling wavelength ratio X as indicated in Expression (1) below. In this situation, as illustrated in FIG. 7, the parameters D1 and D2 in Expression (1) denote the maximum value and the minimum value of the buckling-time bending angle, respectively. The parameter $\alpha$ is a parameter indicating the buckling wavelength ratio at a point P where the value of the buckling-time bending angle is equal to (D1+D2)/2. The parameter $\beta$ is a parameter indicating the degree of inclination (the slope) observed when the value of the buckling-time bending angle decreases from the maximum value to the minimum value. Each of the values of the parameters D1, D2, $\alpha$, and $\beta$ depends on the outside diameter and the thickness of the steel pipe. A steel pipe having a high level of deformability satisfies the conditions where the value of the parameter D1 is large and where the buckling wavelength ratio (w/$\lambda$) of the waveform shape, which is characteristic to UOE steel pipes, is small. When the wavelength of the waveform shape is not controlled and sufficiently long, the deformability may decrease down to the parameter D2. To control the wavelength of the waveform shape during the manufacturing process to bring the level of deformability close to the maximum deformability D1 that can be achieved by a steel pipe, it is necessary to keep the value of the parameter $\alpha$ small. Theoretically, for example, when the buckling wavelength ratio (w/$\lambda$) is equal to the value of the parameter $\alpha$, the level of deformability corresponds to the intermediate value between the parameter D1 and the parameter D2. When the user wishes to improve the deformability from the lowest value represented by the parameter D2, even by as little as 10% of the room for growth expressed as (D1−D2), it is a good idea to select (−X+$\alpha$)/$\beta$=1.1 which corresponds to the situation where the value of tan h((−X+$\alpha$)/$\beta$) calculated from Expression (1) is equal to −0.4. It is considered that the deformability required of steel pipes varies depending on impacts made on public safety and environment conservation by buckling and destructing phenomena exhibited thereby. Further, exercising control to keep the buckling wavelength ratio (w/$\lambda$) small, i.e., exercising control finely on the wavelength of the waveform shape of a steel pipe, usually makes the pipe expansion process longer and may cause a disadvantage in terms of productivity. By using the mathematical expression below, it is possible to control the manufacturing method to realize a required level of deformability. It is therefore possible to provide a steel pipe product having a cost advantage, by realizing a level of deformability that is both necessary and sufficient.

$$\text{The buckling-time bending angle} = \quad (1)$$
$$(D1+D2)/2 + (D1-D2)/2 * \tanh((-X+\alpha)/\beta)$$

Accordingly, it is possible to design a steel pipe of which it is possible to improve deformability while reducing the labor and time required by the pipe expansion process, by preparing values of the parameters D1, D2, $\alpha$, and $\beta$ for each of the various outer diameters and the thicknesses of steel pipes in advance through an experiment or an analysis, subsequently reading such values of the parameters D1, D2, $\alpha$, and $\beta$ that correspond to the outside diameter and the thickness of a steel pipe to be manufactured, further evaluating the relationship between the buckling-time bending angle and the buckling wavelength ratio X by constructing Expression (1) while using the read values, and determining the wavelength and the amplitude of the waveform shape of the steel pipe to be manufactured on the basis of the result of the evaluation. Further, by performing the pipe expansion process according to the determined buckling wavelength ratio, it is possible to manufacture a steel pipe in which the deformability is improved, while reducing the labor and time required by the pipe expansion process. The steel pipe is applicable to a steel pipe structure such as a pipeline, a steel pipe pile, a steel pipe sheet pile, a water gate penstock, or the like.

A number of examples have thus been explained to which steel pipes, structures and methods are applied. However, this disclosure is not limited to the text and drawings presented in the examples to represent a part of the disclosure. In other words, other modes of carrying out steel pipes, structures and methods, other examples, operation techniques and the like that can be arrived at by one skilled in the art on the basis of the described examples all fall within the scope of the appended claims.

INDUSTRIAL APPLICABILITY

It is possible to provide the steel pipe, the steel pipe structure, the method of manufacturing a steel pipe, and the method of designing a steel pipe with which it is possible to improve the deformability while reducing the labor and time required by the pipe expansion process.

The invention claimed is:

1. A steel pipe having a waveform shape formed on an outer diameter thereof by a pipe expansion process, wherein a value a/w is 0.038% or less, where a and w denote an amplitude and a wavelength of the waveform shape, respectively.

2. The steel pipe according to claim 1, wherein a value w/λ defining a ratio of the wavelength w of the waveform shape to a Timoshenko's buckling wavelength λ is larger than 0.8.

3. A steel pipe structure comprising the steel pipe according to claim 1.

4. A method of manufacturing a steel pipe having a waveform shape formed on an outer diameter thereof by a pipe expansion process, comprising a step of forming the waveform shape such that a value a/w is 0.038% or less, where a and w denote an amplitude and a wavelength of the waveform shape, respectively.

5. A method of designing a steel pipe having a waveform shape formed on an outer diameter thereof by a pipe expansion process, the method comprising:

a step of evaluating, with respect to the steel pipe to be manufactured, a relationship between ratio w/λ and a buckling-time bending angle by using Equation (1), the ratio w/λ defining a ratio of a wavelength w of the waveform shape to a Timoshenko's buckling wavelength λ, and further determining the wavelength w and an amplitude a of the waveform shape, on a basis of a result of the evaluation:

$$\text{The buckling-time bending angle} = (D1+D2)/2 + (D1-D2)/2 * \tanh((-X+\alpha)/\beta) \quad (1)$$

where parameters "D1", "D2", "α", and "β" have values determined by the outer diameter and a thickness of the steel pipe to be manufactured.

6. A steel pipe structure comprising the steel pipe according to claim 2.

* * * * *